United States Patent [19]
Taguchi

[11] Patent Number: 5,602,807
[45] Date of Patent: Feb. 11, 1997

[54] MAGNETO-OPTICAL RECORDING HEAD HAVING A POT CORE

[75] Inventor: Keiichi Taguchi, Kanagawa, Japan

[73] Assignee: Sony Corporation, Tokyo, Japan

[21] Appl. No.: 234,066

[22] Filed: Apr. 28, 1994

[30] Foreign Application Priority Data

Apr. 28, 1993 [JP] Japan .................................. 5-103207

[51] Int. Cl.$^6$ .................................................. G11B 13/04
[52] U.S. Cl. .................................................. 369/13
[58] Field of Search ........................... 369/44.14, 44.19, 369/13, 112; 360/114, 59

[56] References Cited

U.S. PATENT DOCUMENTS

| | | | |
|---|---|---|---|
| 4,843,600 | 6/1989 | Miyajima et al. | 369/13 |
| 5,065,270 | 11/1991 | Koyanagi et al. | 360/123 |
| 5,072,431 | 12/1991 | Ohmori et al. | 369/13 |
| 5,140,568 | 8/1992 | Yoda | 369/13 |
| 5,260,921 | 11/1993 | Shibuya et al. | 369/13 |
| 5,402,293 | 3/1995 | Smith | 66/360 |

FOREIGN PATENT DOCUMENTS

| | | |
|---|---|---|
| 0230325A2 | 7/1987 | European Pat. Off. . |
| 0336687A2 | 10/1989 | European Pat. Off. . |
| 0555801A1 | 8/1993 | European Pat. Off. . |
| 0593059 | 4/1994 | European Pat. Off. . |
| 63-55704 | 8/1986 | Japan . |
| 63-249905 | 4/1987 | Japan . |
| 4-10202 | 1/1992 | Japan . |

OTHER PUBLICATIONS

J. J. M. Ruigrok, F. J. A. M. Greidanus, W. F. Godlieb, and J. H. M. Spruit: "Design and Performance of Magnetic Heads for Magneto–Optic Recording with Magnetic Field Modulation," Philips Research Laboratories, The Netherlands, *American Institute of Physics*, 15 Apr. 1988, pp. 3847–3849.

*Primary Examiner*—Nabil Z. Hindi
*Attorney, Agent, or Firm*—Limbach & Limbach

[57] ABSTRACT

A magneto-optical recording apparatus for recording information signals on a magneto-optical recording medium is comprised of an optical pickup device for emitting a laser beam to a lower side of the magneto-optical recording medium, a magnetic head including a pot core which has a center pillar and a coil which is wound around the center pillar and supplying a magnetic power to an upper side of the magneto-optical recording medium, and a holding device for holding the magnetic head so as not to contact with the upper side of the magneto-optical recording medium when the information signals are recorded on the magneto-optical recording medium.

3 Claims, 6 Drawing Sheets

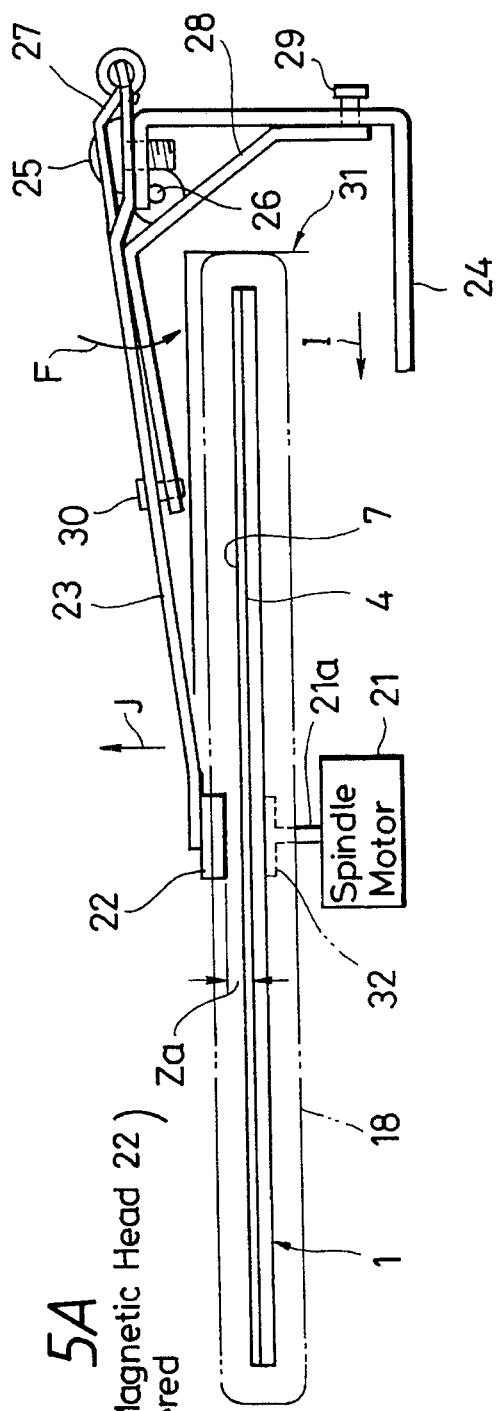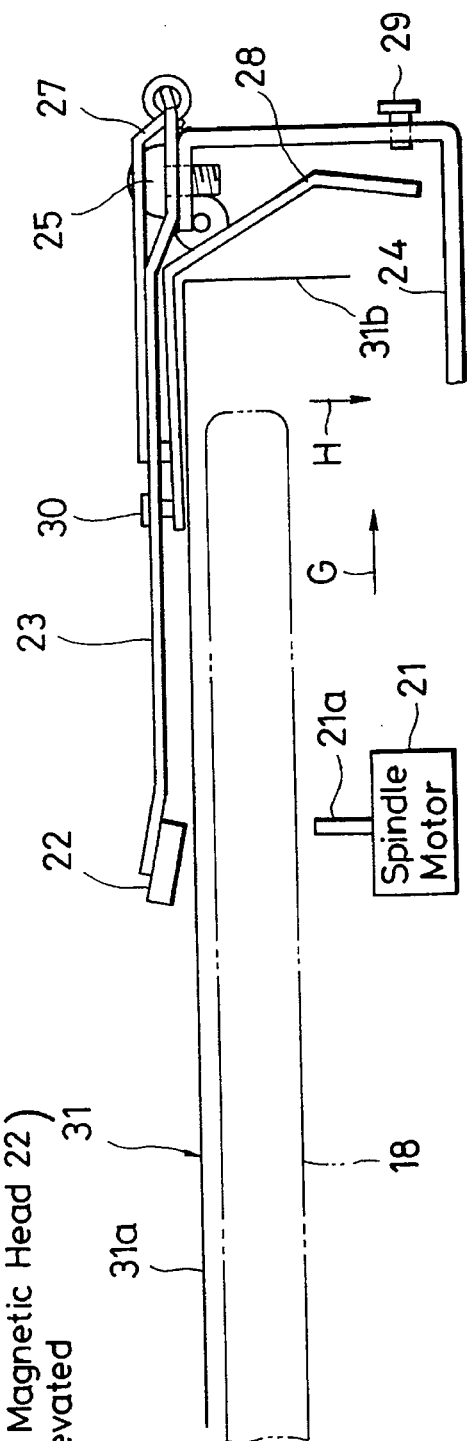

MAGNETO-OPTICAL RECORDING HEAD HAVING A POT CORE

BACKGROUND OF THE INVENTION

1. Field of the Invention

The present invention relates to a magneto-optical recording apparatus for use with a magneto-optical recording and reproducing apparatus capable of recording and reproducing a magneto-optical recording medium, such as a mini disc (MD) or the like, for example.

2. Description of the Prior Art

Magneto-optical recording and reproducing apparatus that can record and reproduce a magneto-optical disk in 64 mm in diameter accommodated in a disk cartridge, i.e., so-called mini disc (MD), are now commercially available on the market.

FIG. 1 of the accompanying drawings shows a structure of a magneto-optical disk 1 that is recorded and reproduced by this type of magneto-optical recording and reproducing apparatus. As shown in FIG. 1, the magneto-optical disk 1 has a multi-layer structure having a thickness $D_1$ ($D_1$=1.2 mm). Specifically, the magneto-optical disk 1 is formed of 6 layers in which a dielectric layer 3, a recording layer 4 serving as a magnetic film, a dielectric layer 5, a reflection layer 6 and a lubrication protecting layer 7 are laminated on a polycarbonate substrate 2, in that order. A spacing $Z_s$ from the surface of the protecting layer 7 to a center 4c of the recording layer 4 lies in a range of from about 20 to 30 μm.

A magnetic field modulation overwrite head (simply referred to hereinafter as "magnetic head") 8 is disposed in contact with the protecting layer 7 of the magneto-optical disk 1. An optical pickup device 10 of a non-contact type having an objective lens 9 is disposed at the position opposing the magnetic head 8 across the magneto-optical disk 1.

The magnetic head 8 comprises an E-type core 11 having a center core portion 11a shown in FIG. 2 and a winding 13 formed by a plurality of turns of conductors 12 wound on the center core portion 11a.

In the magneto-optical recording and reproducing apparatus thus arranged, the direction of a magnetic field supplied to the recording layer 4 is determined by switching a polarity of a current flowed to the winding 13 from terminals 14 and 15. A magnetization on the recording layer 4 is erased by heating the recording layer 4 at temperature higher than a Curie temperature obtained when the recording layer is radiated with a laser spot L converged by the objective lens 9. If the magneto-optical disk 1 is rotated to move the laser spot L from the recording layer 4 at its portion in which the magnetization was erased, then the temperature at that portion is progressively lowered with the result that the recording layer 4 is magnetized in the direction of the magnetic field supplied to that portion from the magnetic head 8.

At that time, the quality, such as a carrier-to-noise ratio (C/N), of signals obtained when the magneto-optical disk 1 is recorded and reproduced depends considerably on intensity of an external magnetic field supplied to the recording layer 4 of the magneto-optical disk 1 from the magnetic head 8.

To increase the intensity of the external magnetic field supplied to the recording layer 4 of the magneto-optical disk 1, a distance between the tip end of the magnetic head 8, i.e., the tip end (open end side) of the center core portion 11a of the E-type core 11 and the recording layer 4 should be reduced as much as possible because intensity of magnetic field is in inverse proportion to the square of distance.

For this reason, the conventional magneto-optical disk recording and reproducing apparatus is arranged to record an information signal on the magneto-optical disk 1 by sliding the magnetic head 8 while the magnetic head is in contact with the magneto-optical disk 1 as shown in FIG. 1. Even though the magnetic head 8 is brought in contact with the magneto-optical disk 1, the magnetic head 8 is slid in contact with the protecting layer 7 in actual practice, keeping the spacing $Z_s$ corresponding to the thicknesses of the dielectric layer 5, the reflection layer 6 and the protecting layer 7 left between the magnetic head 8 and the center 4c of the recording layer 4.

FIG. 3 is a graph showing a relationship between the magnetic head 8 and the C/N. In FIG. 3, a horizontal axis represents a spacing Z distant from the center 4c of the recording layer 4 where the center 4c of the recording layer 4 is assumed to be zero. A vertical axis represents a C/N. In FIG. 3, reference symbol E represents a characteristic of the magnetic head 8 obtained when the E-type core 11 shown in FIG. 2 is used. A value TL on the vertical axis represents a C/N value that is required to obtain a satisfactory error rate upon playback. A specific value of TL is 46 dB. On the horizontal axis, a value $Z_s$ represents a spacing (approximately 20 to 30 μm in actual practice) from the center 4c of the recording layer 4 to the surface of the protecting layer 7 shown in FIG. 1. Study of FIG. 3 reveals that the magnetic head 8 of the contact sliding type using the E-type core 11 shown in FIG. 2 can produce a C/N sufficiently higher than the C/N value TL which is needed to obtain a satisfactory error rate.

A force to urge the magnetic head 8 against the magneto-optical disk 1 should preferably be made as small as possible because such small force cannot substantially affect the rotation of the magneto-optical disk 1, i.e., a load on a spindle motor (not shown) is small. For this reason, the weight of the magnetic head 8 is limited to a certain extent. Also, the diameter of the E-type core 11 and the number of turns of the conductor 12 are limited.

As shown in FIG. 4, when the magnetic head 8 is brought in slidable contact with the magneto-optical disk 1, it is frequently observed that the magneto-optical disk 1 is rotated with a disk surface fluctuation m (see FIG. 4) in the axial direction (upper and lower direction) of the magneto-optical disk 1 because the thickness of the magneto-optical disk 1 is not uniform and the magneto-optical disk 1 has an inclination. To remove such disk surface fluctuation m, the magnetic head 8 is constantly spring-biased in the arrow K direction (i.e., the axial direction of the magneto-optical disk 1) through a supporting arm 18 serving as a spring member from a fixed member 17. With this arrangement, the magnetic head 8 can reliably be brought in slidable contact with the disk surface of the magneto-optical disk 1 following the disk surface fluctuation m. As a consequence, a pushing force for urging the magnetic head 8 against the magneto-optical disk 1 cannot be decreased sufficiently.

It has been customary for the user to carry the magneto-optical disk recording and reproducing apparatus when in use. Therefore, it has been requested so far that the magneto-optical disk recording and reproducing apparatus should be made small, light, thin and low in power consumption.

Since however the conventional magneto-optical disk recording and reproducing apparatus is arranged such that the magnetic head 8 is brought in slidable contact with the magneto-optical disk 1, a relatively large load is imposed upon the spindle motor (not shown). Thus, it is difficult to reduce the power consumption of the conventional magneto-optical disk recording and reproducing apparatus.

Further, since the conventional magneto-optical disk recording and reproducing apparatus is of the slidable contact type, it cannot be ensured that the magneto-optical disk recording and reproducing apparatus is reliable under undesirable circumstance, such as dusty circumstance or the like. Further, since the magnetic head 8 is brought in contact with the magneto-optical disk 1 in use, the magnetic head 8 tends to be worn.

To solve the problem that the conventional magneto-optical disk recording and reproducing apparatus is not so high in reliability, it is proposed to construct a magneto-optical disk recording and reproducing apparatus as a non-contact type by spacing the magneto-optical disk 1 and the magnetic head 8 apart from each other with a predetermined distance under servo control. This non-contact type of the magneto-optical disk recording and reproducing apparatus needs an actuator and a servo circuit. Therefore, unavoidably, the proposed magneto-optical disk recording and reproducing apparatus cannot be made small, light, thin and low in power consumption.

OBJECTS AND SUMMARY OF THE INVENTION

It is therefore an object of the present invention to provide an improved magneto-optical recording apparatus in which the aforesaid shortcomings and disadvantages of the prior art can be eliminated.

It is another object of the present invention to provide a magneto-optical recording apparatus of simple arrangement in which a magnetic head and a magneto-optical recording medium can be set in a non-contact relationship.

It is another object of the present invention to provide a magneto-optical recording apparatus which can be made small, light and thin.

It is still another object of the present invention to provide a magneto-optical recording apparatus in which a power consumption can be reduced.

It is a further object of the present invention to provide a magneto-optical recording apparatus in which a magnetic field of sufficiently high intensity can be supplied to a magneto-optical recording medium even when a magnetic head is not in contact with the magneto-optical recording medium.

It is yet a further object of the present invention to provide a magneto-optical recording apparatus which can be improved in reliability even under dusty environment.

According to an aspect of the present invention, there is provided a magneto-optical recording apparatus for recording information signals on a magneto-optical recording medium. The magneto-optical recording apparatus is comprised of an optical pickup device for emitting a laser beam to a lower side of the magneto-optical recording medium, a magnetic head including a pot core which has a center pillar and a coil which is wound around the center pillar and supplying a magnetic power to an upper side of the magneto-optical recording medium, and a holding device for holding the magnetic head so as not to contact with the upper side of the magneto-optical recording medium when the information signals are recorded on the magneto-optical recording medium.

According to the present invention, since the magnetic head using the pot core is used, a magnetic efficiency can be improved as compared with the conventional magnetic head using the E-type core. Also, intensity of a generated magnetic field can be increased so that, even when the magnetic head is not in contact with the magneto-optical recording medium, a sufficient magnetic power can be supplied to the magneto-optical recording medium.

The above and other objects, features, and advantages of the present invention will become apparent from the following detailed description of an illustrative embodiment thereof to be read in conjunction with the accompanying drawings, in which like reference numerals are used to identify the same or similar objects.

BRIEF DESCRIPTION OF THE DRAWINGS

FIGS. 5A and 5B are schematic side views showing an arrangement of the mechanical system of the magneto-optical recording apparatus according to an embodiment of the present invention, respectively;

DETAILED DESCRIPTION OF THE PREFERRED EMBODIMENT

Figure 1:
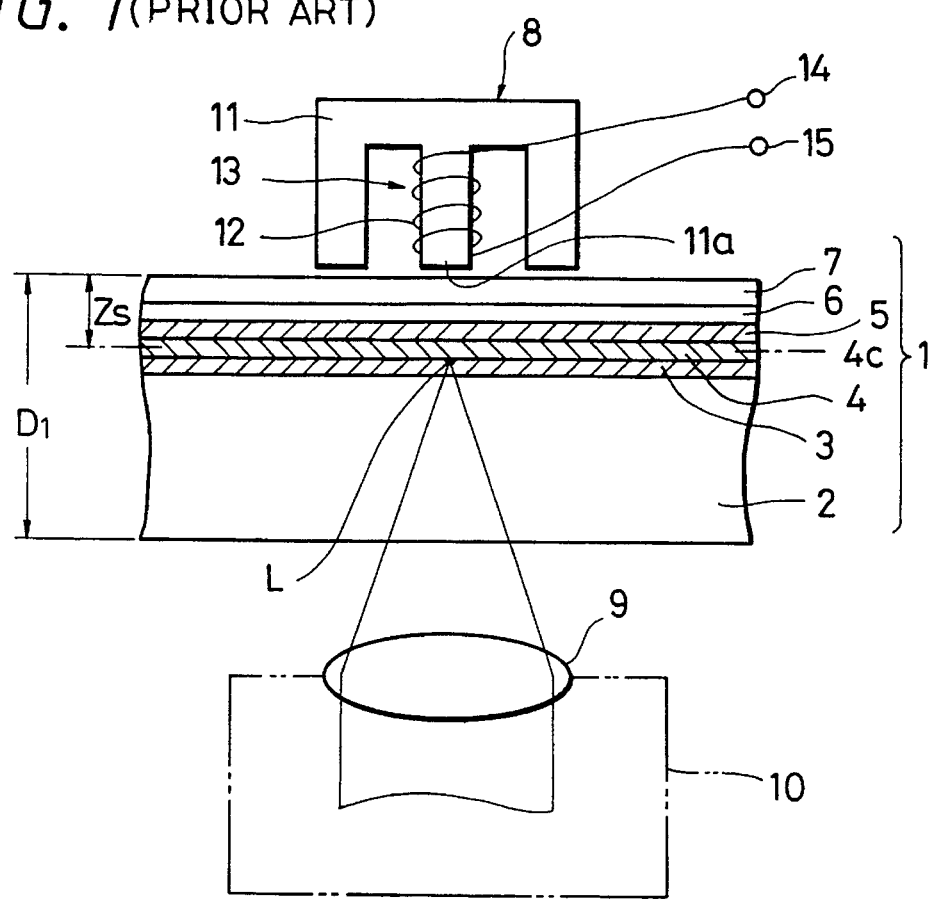
FIG. 1 is a diagram used to explain operation of a conventional magneto-optical recording and reproducing apparatus.

A magneto-optical recording apparatus according to an embodiment of the present invention will hereinafter be described with reference to the drawings. In the following description, the magneto-optical recording apparatus according to the present invention will be compared with the prior art when necessary. Also, in FIGS. 5A, 5B through FIG. 9, like parts corresponding to those of FIGS. 1 to 4 are marked with the same references and therefore need not be described in detail.

FIGS. 5A, 5B schematically show an arrangement of the mechanical system of the magneto-optical recording apparatus according to the embodiment of the present invention. As illustrated in FIGS. 5A, 5B, the magneto-optical recording apparatus according to the present invention drives the mini disc and includes a spindle motor 21 which rotates the magneto-optical disk 1 accommodated within a disk cartridge 18 at a constant linear velocity (CLV). The magneto-optical disk 1 is the same as the magneto-optical disk 1 shown in FIG. 1 in structure and therefore need not be described in detail herein.

As shown in FIG. 5A, when a magnetic head 22 is lowered, the magnetic head 22 is spaced apart by a predetermined distance from the protecting layer 7 of the magneto-optical disk 1 and disposed distant from the recording layer 4 by a predetermined spacing $Z_Q$.

The magnetic head 22 is attached to one end portion of a head arm 23 which is substantially crank-shaped in cross section. The other end portion of the head arm 23 is fixed to a bracket 24 by means of a screw 25.

The head arm 23 is constantly biased in the direction shown by an arrow F in FIG. 5A, i.e., in the direction in which the magnetic head 22 is moved toward the magneto-optical disk 1 under spring force of a torsion spring 27 unitarily secured to the bracket 24.

The bracket 24 has a lever rotating shaft 26 pivotally fixed thereto. The lever rotating shaft 26 has a lever 28 of a substantially U-letter configuration in cross section fixed thereto. One end of the lever 28 is abutted against a head spacing adjustment screw 29 provided on the side wall of the bracket 24. Into the other end of the lever 28 is fitted a spacing adjustment screw 30 which is used when the magnetic head 22 is elevated.

When the magnetic head 22 is elevated as shown in FIG. 5B, the magnetic head 22 is prevented from coming in contact with an inside upper surface of a casing (not shown) of the magneto-optical recording and reproducing apparatus under adjustment of the spacing adjustment screw 30 which abuts against an upper surface 31a of a disk holder 31.

In this state, when the side wall of the disk cartridge 18 is urged against an inner side wall of the head holder 31 by pushing the disk cartridge 18 in the direction shown by an arrow G in FIG. 5B, the disk cartridge 18 is automatically lowered in the direction shown by an arrow H in FIG. 5B in unison with the disk holder 31, whereby the magnetic head 22 is lowered as shown in FIG. 5A.

When the magnetic head 22 is in its lowered state shown in FIG. 5A, a shaft 21a of the spindle motor 21 is chucked to a clamper 32 of the magneto-optical disk 1. Also, when the magnetic head 22 is in its lowered state shown in FIG. 5A, the head spacing adjustment screw 29 abuts against one end portion of the lever 28. In this state, if the head spacing adjustment screw 29 is turned so as to proceed in the direction shown by an arrow I in FIG. 5A, then the magnetic head 22 is translated in the arrow J direction (upper direction). Therefore, the tip end portion of the magnetic head 22 can be placed at the position spaced apart by the predetermined distance $Z_Q$ from the recording layer 4 of the magneto-optical disk 1 by adjusting the head spacing adjustment screw 29.

Under the condition that the magnetic head 22 is in its lowered state shown in FIG. 5A, the magneto-optical disk 1 is recorded and reproduced by the magnetic head 22. Because the bracket 24 is translated by a feeding motor (not shown) in the direction perpendicular to the sheet of drawing forming FIGS. 5A, 5B, the magnetic head 22 is translated in the radial direction of the magneto-optical disk 1 so that the magnetic head 22 can access the whole surface of the recording and reproducing surface of the magneto-optical disk 1.

With the arrangement shown in FIGS. 5A, 5B, it is possible to construct the mechanical system of the magneto-optical recording apparatus of the non-contact type in which the magnetic head 22 is spaced apart by the distance $Z_Q$ from the recording layer 4 of the magneto-optical disk 1 upon recording.

An arrangement of the magnetic head 22 will be described below.

Figure 6A:
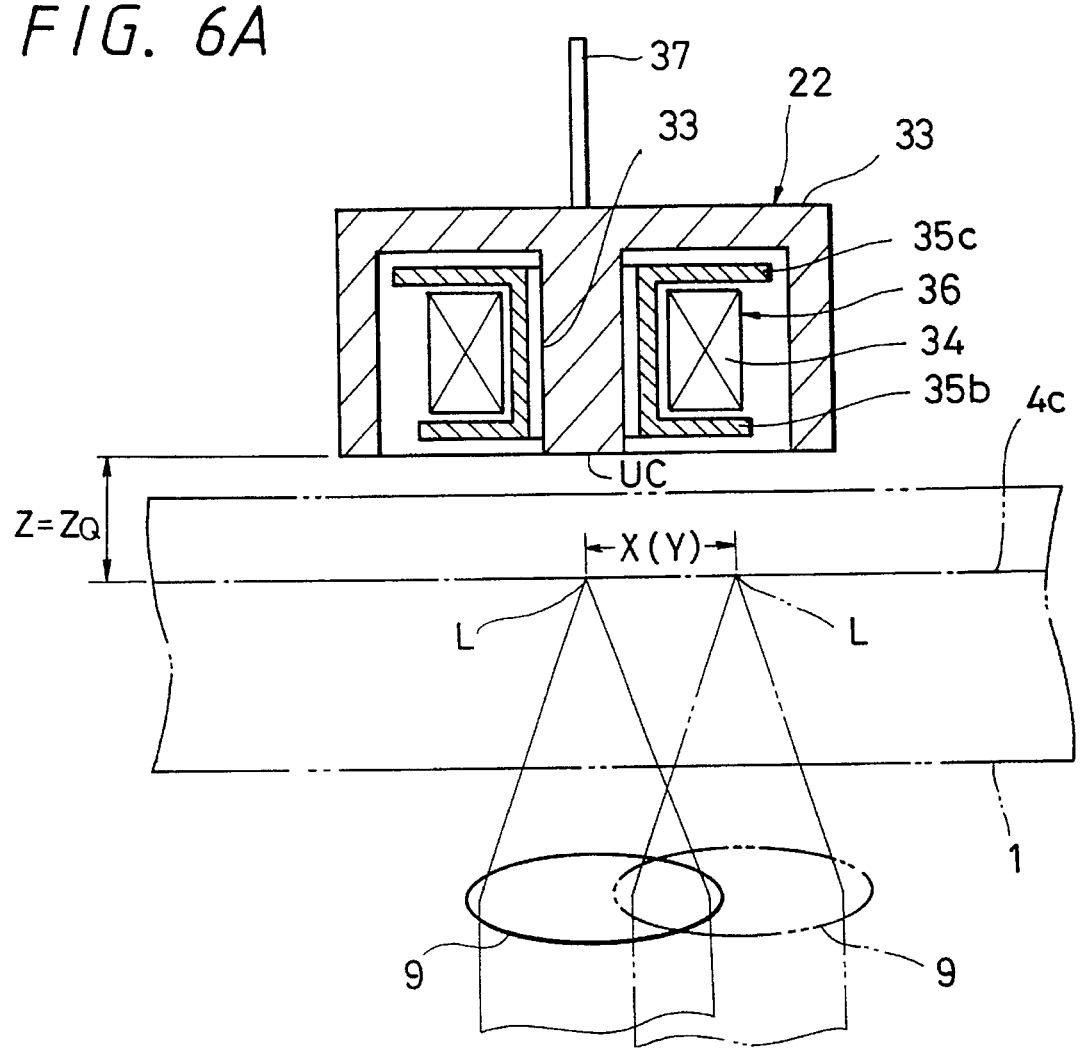
FIGS. 6A and 6B are respectively diagrams showing a main portion of a magneto-optical recording apparatus according to the embodiment of the present invention, and to which reference will be made in explaining operation of the magneto-optical disk recording apparatus.
Figure 6B:
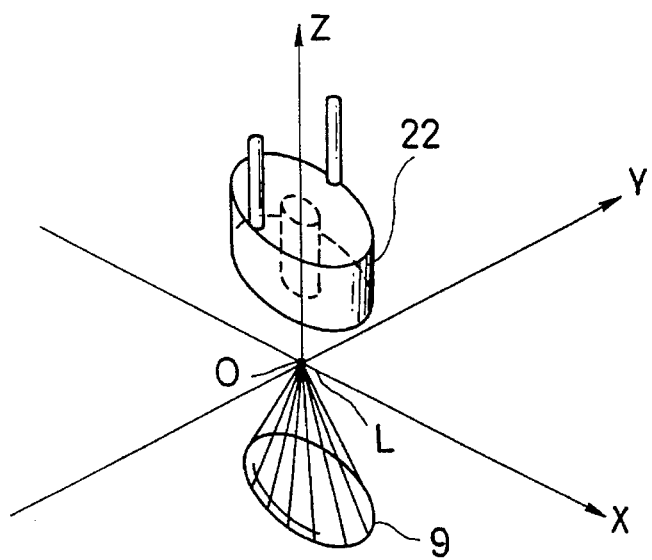
Figure 7A:
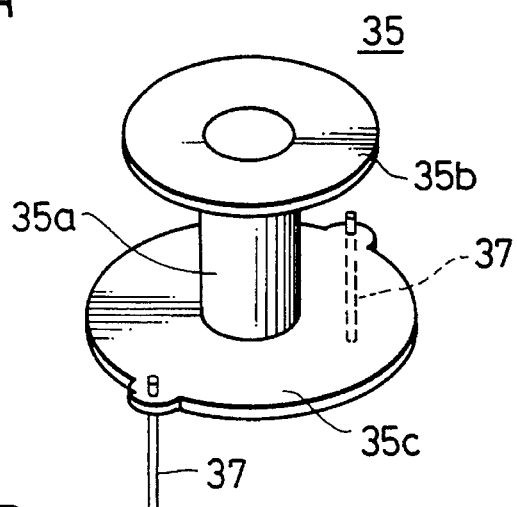
FIGS. 7A through 7C are perspective views showing an arrangement of a magnetic head used in the magneto-optical disk recording apparatus according to the present invention in an exploded fashion, respectively.
Figure 7B:
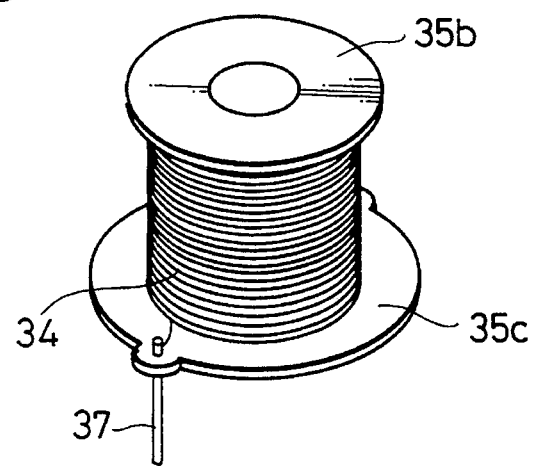
Figure 7C:
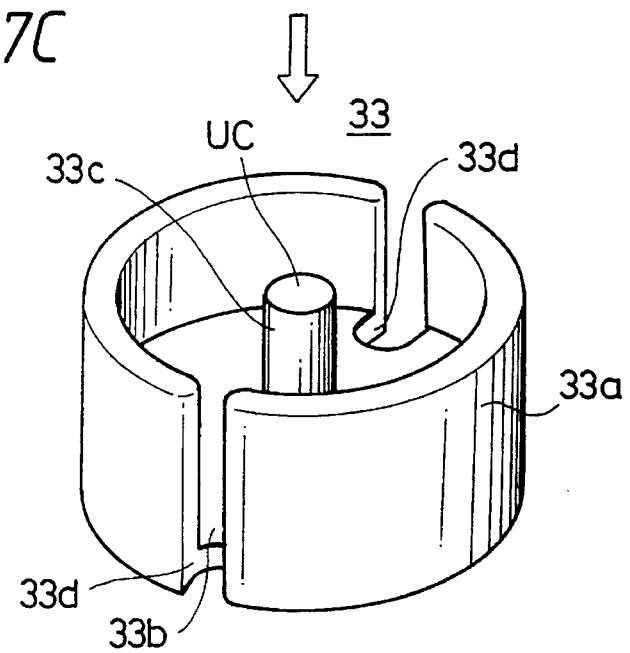

FIG. 6A is a cross-sectional view of the magnetic head 22, and FIG. 6B is a diagram used to explain operation of the magnetic head 22. FIGS. 7A through 7C are respectively perspective views showing the arrangement of the magnetic head 22 in an exploded fashion. Specifically, FIG. 7A shows a pin bobbin 35, FIG. 7B shows a winding assembly 36 in which the pin bobbin 35 has a winding 34, and FIG. 7C shows a pot core 33.

As shown in FIGS. 6A, 6B and FIGS. 7A through 7C, the magnetic head 22 includes the pot core 33 made of ferrite and the winding assembly 36 (pin bobbin 35 having the winding 34).

As shown in FIG. 7C, the pot core 33 comprises a cylindrical portion 33a serving as a side wall portion, a bottom wall portion 33b and a center pillar 33c upwardly extended from the bottom portion 33b along the axial direction. The pot core 33 includes two recesses 33d, 33d defined from the side wall of the cylindrical portion 33a to the bottom portion 33b at an angular spacing of 180 degrees. The cylindrical portion 33a is about 3 mm in height, about 6 mm in outer diameter and is about 5 mm in inner diameter. The center pillar 33c is about 1 mm in diameter.

The pin bobbin 35 is properly shaped so as to be accommodated in the inside hollow portion of the pot core 33. As shown in FIG. 7A, the pin bobbin 35 comprises a cylindrical body 35a and upper and lower flanges 35b, 35c. The lower flange 35c includes on its peripheral edge portion attached pins 37, 37 serving as input terminals which are opposed at an angular extent of 180 degrees. The cylindrical body 35a includes the winding 34 which has about 60 turns of conductors, each having a diameter of 80 μm. A winding starting portion and a winding ending portion of the winding 34 are connected and fixed to the pins 37, 37, respectively.

The winding assembly 36 thus arranged is accommodated within the inside hollow portion of the pot core 33 such that the pins 37, 37 are projected from the recesses 33d, 33d of the bottom portion 33b of the pot core 33, and then fixed therein by some suitable means, such as an adhesive or the like, thereby the magnetic head 22 being formed as shown in FIG. 6A. The surface in which the magnetic head 22 is opposed to the magneto-optical disk 1 is the upper surface of the pot core 33 as shown in FIG. 7C. There is then the risk that lead wires projected over the upper surface excessively will come in contact with the magneto-optical disk 1. The recesses 33d, 33d are therefore provided to downwardly introduce the pins 37, 37 functioning as lead wires therethrough.

The magnetic head 22 can be assembled in a short period of time by using the pin bobbin 35. Even when the pin bobbin 35 is not used, if the lead wires are led out of the recesses 33d, 33d, then the lead wires can be prevented from being projected over a center (center of the upper surface of the center pillar 33c of the pot core 33) UC of the magnetic head 22.

Figure 2:
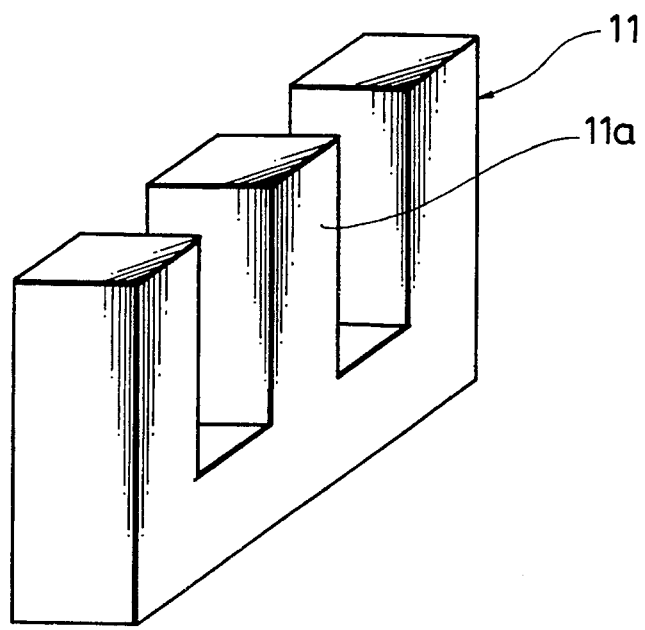
FIG. 2 is a perspective view showing an arrangement of an E-type core forming a magnetic head of the conventional magneto-optical recording and reproducing apparatus shown in FIG. 1.

Although the magnetic head 22 becomes slightly heavier than the conventional magnetic head 8 using the E-type core 11 shown in FIG. 2, intensity of a magnetic field generated from the magnetic head 22 becomes strong about 1.5 times.

The possibility that the magnetic head 22 using the pot core 33 can be used as the non-contact type magnetic head in actual practice will be examined below.

FIGS. 6A, 6B show a relationship among the magnetic head 22, the recording layer 4 and the laser spot L focused on the recording layer 4 (center 4c of the recording layer 4) through the objective lens 9. More specifically, a positional displacement between the center UC of the upper surface of the magnetic head 22 and the laser spot L is expressed by a two-dimensional coordinate of X and Y axes, and the spacing between the center UC of the upper surface and the center 4c of the recording layer 4 is expressed by a Z-axis coordinate.

Figure 3:
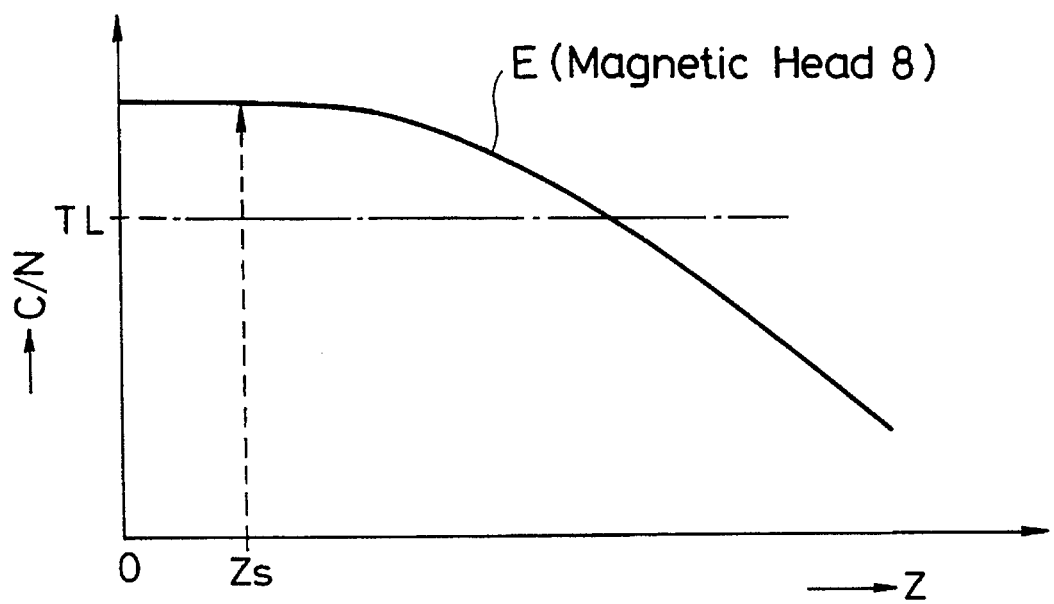
FIG. 3 is a graph showing a C/N characteristic in the Z axis direction of-the conventional contact-type magnetic head shown in FIG. 2.
Figure 4:
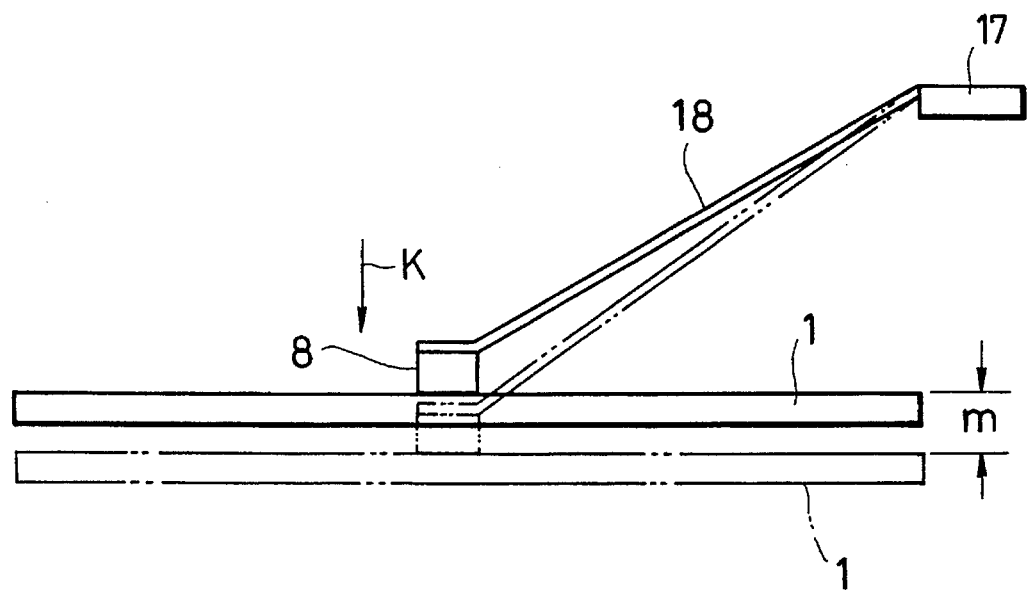
FIG. 4 is a diagram used to explain how to remove a disk surface fluctuation according to the prior art.
Figure 8:
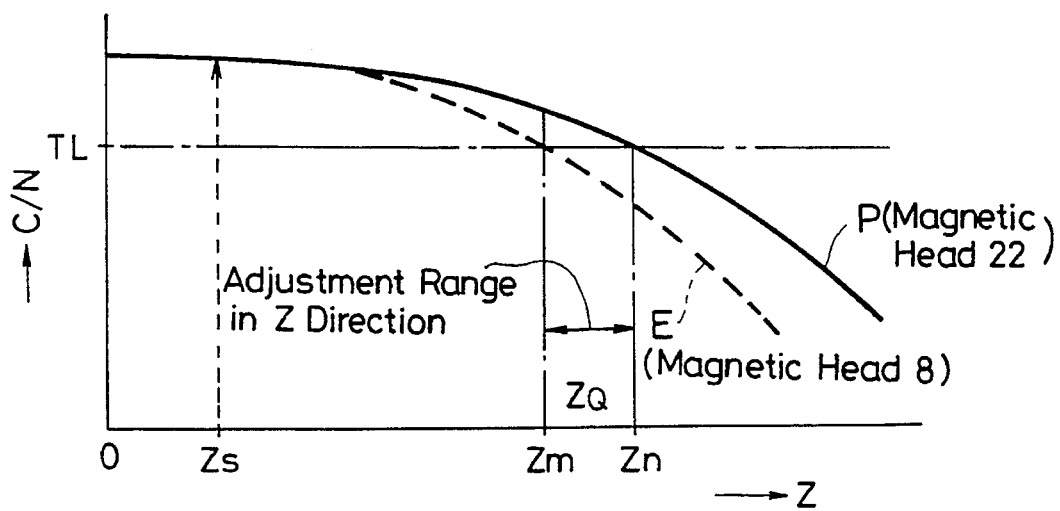
FIG. 8 is a graph showing measured results of C/N characteristics obtained when a C/N characteristic in the Z axis direction of the non-contact type magnetic head shown in FIGS. 5A, 5B and FIGS. 7A through 7C and a C/N characteristic in the Z axis direction of the conventional contact-type magnetic head are compared with each other.

FIG. 8 corresponds to FIG. 3 and shows a relationship between a spacing Z in the Z-axis direction and a C/N obtained when the center UC of the upper surface of the magnetic head 22 is placed at an origin O of the X and Y axes. In FIG. 8, a characteristic shown by a dashed curve E is the same as the characteristic (FIG. 3) of the conventional magnetic head 8. A characteristic shown by a solid curve P represents a characteristic of the magnetic head 22 according to the embodiment of the present invention. In FIG. 8, reference symbol Zm depicts a maximum value of the disk surface fluctuation m (see FIG. 4) caused by the uneven thickness and the inclination of the magneto-optical disk 1 when the magneto-optical disk 1 is rotated. In FIG. 8, reference symbol Zn depicts a spacing between points at which the C/N value TL necessary for obtaining a satisfactory error rate and the characteristic P cross each other.

Study of FIG. 8 reveals that the conventional magnetic head 8 using the E-type core 11 produces a C/N which is less than the value TL at the point Zm. Therefore, it is impossible to place the magneto-optical disk 1 and the magnetic head 8 in a non-contact relationship. However, as will be clear from FIG. 8, according to the magnetic head 22 using the pot core 33 of this embodiment, if the spacing Z between the center UC of the upper surface of the magnetic head 22 and the center 4c of the recording layer 4 is selected between the points Zm and Zn, then a C/N can be set to be higher than the C/N value TL for obtaining a satisfactory error rate even when the magnetic head 22 is not in contact with the magneto-optical disk 1. In this sense, the predetermined spacing $Z_O$ between the points Zm and Zn can be regarded as an adjustable range of the magnetic head 22 in the Z direction.

Therefore, if the spacing between the center 4c of the recording layer 4 and the magnetic head 22 is adjusted to equal to the spacing $Z_O$ by turning the head spacing adjustment screw 29 shown in FIG. 5A, then even the non-contact magnetic head 22 can obtain a C/N higher than the value TL.

Figure 9:
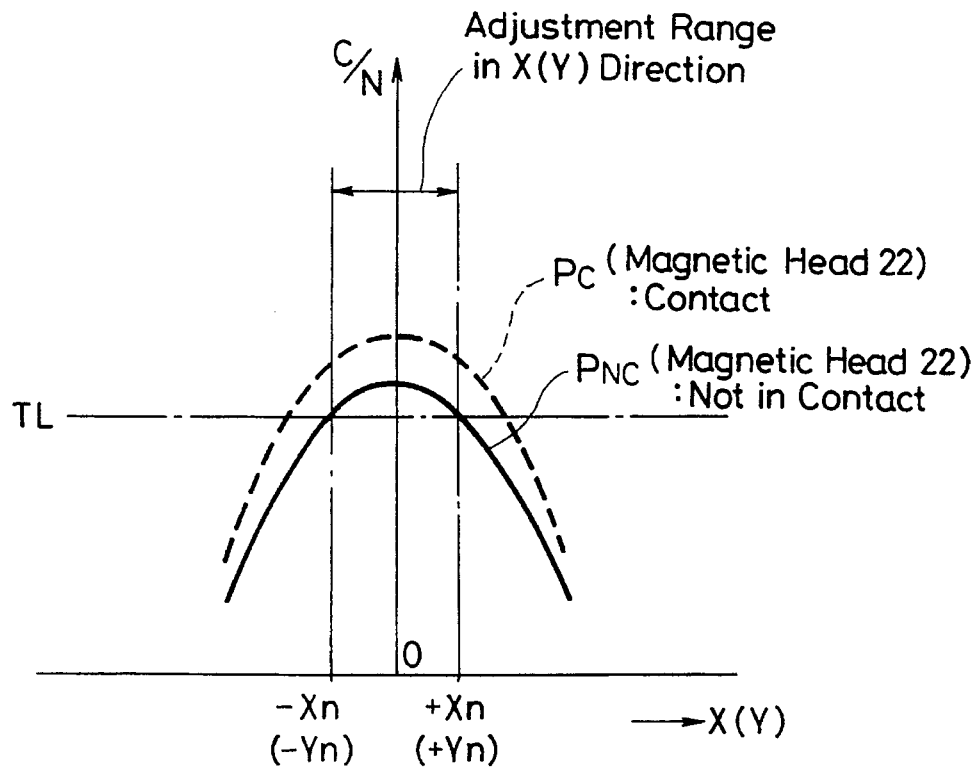
FIG. 9 is a diagram showing C/N characteristics in the X and Y axes of the non-contact type magnetic head shown in FIGS. 5A, 5B and FIGS. 7A through 7C according to the present invention.

FIG. 9 shows characteristics in which C/N is deteriorated in accordance with an increase of shift amounts X and Y when the center UC of the upper surface of the magnetic head 22 is shifted from the laser spot L on the X and Y coordinates. In FIG. 9, a solid curve $P_{NC}$ indicates a characteristic obtained when the magnetic head 22 is not in contact with the magneto-optical disk 1. A dashed curve $P_c$ indicates a characteristic obtained when the magnetic head 22 is brought in contact with the magneto-optical disk 1. Study of FIG. 9 reveals that, even when the magnetic head 22 is not in contact with the magneto-optical disk 1, the C/N can be set to be higher than the C/N value TL which can obtain a satisfactory error rate up to shift amounts ±Xn. In that sense, the interval of the shift amounts ±Xn including the origin O can be regarded as an adjustment range of the magnetic head 22 in the X and Y directions.

As described above, according to the embodiment of the present invention, since the magnetic head 22 using the pot core 33 is used, a magnetic efficiency can be enhanced as compared with that of the conventional magnetic head 8 using the E-type core. Therefore, since intensity of the magnetic field can be increased comparatively, satisfactory intensity of magnetic field can be supplied to the magneto-optical disk 1 even when the magnetic head 22 is not in contact with the magneto-optical disk 1. Since the magnetic head 22 is not in contact with the magneto-optical disk 1, the magnetic head 22 can perfectly be prevented from being worn and the magnetic head 22 can be extended in life. Therefore, the magneto-optical recording apparatus according to the present invention can become more reliable. Further, the load on the spindle motor 21 can be reduced and therefore a power consumption of the magneto-optical recording apparatus can be reduced.

Furthermore, since the power consumption is reduced, a transformer or the like in a power supply circuit of the magneto-optical recording apparatus can be reduced in weight and therefore the magneto-optical recording apparatus can be made small, light and thin on the whole.

As set forth, according to the present invention, since the magnetic field modulation overwrite head using the pot core is used as the magnetic head, a magnetic efficiency can be enhanced and intensity of a magnetic field can be increased as compared with the conventional magnetic field modulation overwrite head using the E-type core. Therefore, a satisfactory magnetic power can be supplied to the magneto-optical recording medium even when the magnetic head is not in contact with the magneto-optical recording medium.

Further, according to the present invention, since the magnetic field modulation overwrite head is not in contact with the magneto-optical recording medium, a load on the spindle motor can be reduced and therefore the power consumption of the magneto-optical recording apparatus can be reduced. Also, the magneto-optical recording apparatus according to the present invention can be improved in reliability under dusty circumstances.

Furthermore, according to the present invention, since the power consumption of the magneto-optical recording apparatus can be reduced, the power supply circuit, such as a power supply transformer or the like, can be simplified in arrangement with the result that the magneto-optical recording apparatus itself can be made small, light and thin.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A magneto-optical recording apparatus for recording information signals on a magneto-optical recording medium, comprising:

optical pickup means for emitting a laser beam to a lower side of said magneto-optical recording medium;

a magnetic head including a pot core which has a center pillar;

a bobbin having a hollow cylindrical body adaptable to fit over the center pillar, and having a coil wound around said cylindrical body, said coil when energized providing a magnetic field to one side of said magneto-optical recording medium, wherein said bobbin has two pins and two end portions of said coil are respectively connected to said two pins and said two pins are led out to the outside of said magnetic head through said two recesses of said pot core; and holding means for holding said magnetic head so as not to contact with said upper side of said magneto-optical recording medium when said information signals are recorded on said magneto-optical recording medium.

2. A magnetic recording apparatus as in claim 1 wherein said pot core includes a unitary side wall and bottom wall.

3. The magneto-optical recording apparatus according to claim 2, wherein said pot core has two recesses defined from its side wall to bottom wall portions and two end portions of said coil are led out to the outside of said pot core through said two recesses.

* * * * *